United States Patent Office 3,655,615
Patented Apr. 11, 1972

3,655,615
COMPOUNDS CONTAINING SILICON AND NITROGEN
Richard P. Bush, Penarth, and Bryan Thomas, Tonyrefail, Wales (both c/o Midland Silicones Limited, Reading, England)
No Drawing. Filed Feb. 2, 1970, Ser. No. 8,017
Int. Cl. C08f *11/04*
U.S. Cl. 260—46.5 E                6 Claims

ABSTRACT OF THE DISCLOSURE

Organosilicon polymers, for example, those containing units of the general formula

[—$R^4R'_2Si(OSiR_2)_nQ(R_2SiO)_nSiR'_2$
$R^4Si(R^5)_2(OSiR^5_2)_p$—]

wherein R is a lower alkyl radical or phenyl radical, R' and $R^5$ are monovalent hydrocarbon or monovalent halogenated hydrocarbon radicals free of aliphatic unsaturation, R'' is a hydrocarbon radical containing aliphatic unsaturation, $R^4$ is a divalent hydrocarbon radical, Q represents a cyclic silazane or cyclic siloxazane structure which is attached to adjacent silicon atoms through silicon-nitrogen linkages, n is 0 or 1 and p is 0 or an integer, are prepared by reacting (A) an organosilicon compound containing at least one Si-bonded hydrogen atom with (B) a cyclic silazane or siloxazane containing from 1 to 3 inclusive groups of structure

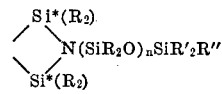

These polymers are useful as lubricants and elastomers.

---

This invention relates to compounds, which term as employed herein includes polymers, containing both silicon and nitrogen. The invention also relates to a process for the preparation of such compounds.

According to the invention, there is provided a process for the preparation of compounds containing silicon and nitrogen which comprises reacting (A) an organosilicon compound containing at least one silicon-bonded hydrogen atom with (B) a cyclic silazane or cyclic siloxazane containing from one to three inclusive groups of the structure

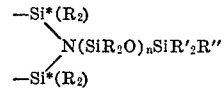

wherein the free valency bond of each of the two Si* atoms is attached to another member of the cyclic silazane or cyclic siloxazane structure, each R represents an alkyl radical having less than 7 carbon atoms or a phenyl radical, each R' represents a monovalent hydrocarbon radical or monovalent halogenated hydrocarbon radical free of aliphatic unsaturation, R'' represents a hydrocarbon radical containing aliphatic unsaturation and n is 0 or 1.

The organosilicon compound (A) which is reacted with the defined cyclic silazane or siloxazane (B) according to this invention can be any organosilicon compound containing at least one silicon-bonded hydrogen atom. Thus, it can be, for example, an organosilane, an organosiloxane polymer, an organosilcarbane polymer or a polymer containing both silcarbane and siloxane linkages. The silicon-bonded organic substituents present in component (A) can be any organic radicals which are inert under the conditions of the reaction, for example, monovalent hydrocarbon and substituted hydrocarbon radicals free of aliphatic unsaturation and monovalent hydrocarbon radicals free of aliphatic unsaturation and containing oxygen in the form of ether linkages. Examples of such radicals are alkyl radicals such as methyl, ethyl, propyl, dodecyl and octadecyl radicals, cycloalkyl radicals such as cyclopentyl and cyclohexyl radicals, aryl radicals such as phenyl and tolyl radicals, aralkyl radicals such as benzyl and 2-phenylethyl radicals, substituted hydrocarbon radicals such as chlorophenyl, bromomethyl, 3,3,3 - trifluoropropyl, cyanobutyl and aminopropyl radicals and radicals such as methoxyethyl and ethoxypropyl. Preferably, the organic radicals present in (A) are selected from methyl and phenyl radicals. Examples of silanes which can be employed as reactant (A) herein are methylchlorophenylsilane, dimethylsilane, dimethylphenylsilane, methoxy methyl(dimethyl)silane and tetramethyldisilane. Examples of operative organosiloxanes are pentamethyldisiloxane, nonamethylpentasiloxane, poly(methylhydrogen)siloxanes, copolymers of phenylmethylsiloxanes and methylhydrogensiloxanes and copolymers of dimethylsiloxane units and $(CH_3)_2HSiO$— units. Other operative organosilicon compounds include SiH— containing silethylene siloxanes and silphenylene siloxanes.

As reactant (B) in the process of this invention, there can be employed any cyclic silazane or cyclic siloxazane containing from one to three, and preferably two, groups of the structure

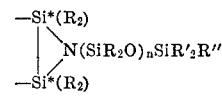

in which the free valency bond of each of the two Si* atoms is attached to another member of the cyclic silazane or cyclic siloxazane structure. In the said group, two of the Si* atoms attached to the nitrogen atom will be members of the cyclic silazane or cyclic siloxazane structure. Depending on the nature of the structure, the said Si* atoms can form part of only one group or, for example, in the case of a silazane, can be common to two or three of the specified groups.

Examples of the operative silazane and siloxazane reactants, therefore, are

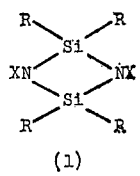  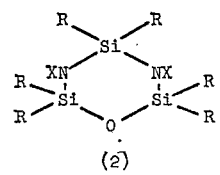
(1)                      (2)

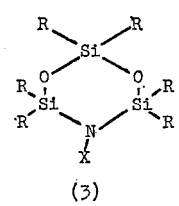  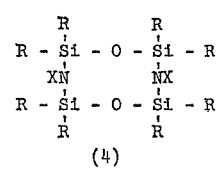
(3)                      (4)

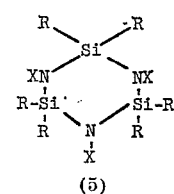
(5)

in which structures each X represents the group

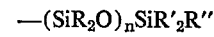
—$(SiR_2O)_nSiR'_2R''$

The cyclic silazanes and siloxazanes (B) can be prepared by the methods disclosed in our U.S. copending applications Ser. Nos. 809,950 and 812,300. Basically, such methods comprise reacting the appropriate cyclic siloxazane with a hydrocarbon-lithium compound, e.g., lithium butyl, and thereafter reacting the lithiated siloxane or a conversion product thereof, with a halosilane, R″R′$_2$SiHal, where Hal represents a halogen atom and R″ and R′ are as defined above. Thus, for example, compounds having the structure (1) in which $n$ in each X group has a value of unity can be prepared by the reaction of a 1,5-diaza-3,7-dioxa-2,4,6,8-tetrasilacyclo-octane with sufficient butyl lithium to react with both amine groups, allowing the product to convert to the lithio-siloxy substitued cyclic disilazane and, thereafter, reacting the disilazane with a chlorosilane R″R′$_2$SiCl. Compounds of the structure (1) wherein each $n$ has a value of zero can be prepared by an extension of known methods, for example, by reaction of

with R$_2$SiCl$_2$

Cyclic siloxazanes of the structures (2), (3) and (4) can also be prepared via lithiation of the appropriate cyclic siloxazane, with or without spontaneous conversion of the lithium compound to a smaller cyclic structure, and subsequent reaction with a halosilane containing the unsaturated radical R″.

In the cyclic silazane and siloxazane reactants (B), the R radicals, which can be the same or different, are alkyl radicals having less than 7 carbon atoms or phenyl radicals. The radicals R′ are selected from one or more monovalent hydrocarbon radicals and monovalent halogenated hydrocarbon radicals, for example, alkyl radicals such as methyl, ethyl, propyl, dodecyl and octadecyl, cycloalkyl radicals such as cyclopentyl and cyclohexyl, aryl radicals such as phenyl and tolyl, aralkyl radicals such as benzyl and 2-phenylethyl and haloalkyl and haloaryl radicals such as chloromethyl, bromophenyl and trifluoropropyl. R″ repersents a hydrocarbon radical containing aliphatic unsaturation, for example, the vinyl, allyl, cyclohexenyl or styryl radicals. Preferably, R″ is vinyl.

The process of this invention involves the addition of the ≡SiH group in reactant (A) to the ≡SiR″ group in reactant (B). The addition of silicon-bonded hydrogen atoms to silicon-bonded unsaturated radicals is a reaction well known in the art of organosilicon chemistry.

The reaction is best performed in the presence of a catalyst. A wide variety of catalysts for the addition of ≡SiH to unsaturated groups are known in the art including, for example, platinum metals, e.g., platinum, rhodium and palladium, compounds of platinum metals, e.g., chloroplatinic acid, platinic chloride, ruthenium chloride, iridium chloride and potassium chloroplatinite, complexes of platinum halides with compounds of sulphur, phosphorus and nitrogen, complexes of platinous salts with olefins or free radical generators, e.g., azobisisobutyronitrile. Any of the known techniques and catalysts can be employed to react (A) and (B) according to the process of this invention.

The most preferred catalysts for use herein are platinum and chloroplatinic acid. The proportion of catalyst employed is not critical and the presence of as little as 10 parts of platinum per million parts of (A) and (B) is normally sufficient to expedite the reaction. The reaction can be carried out in the presence or absence of solvents and at temperatures ranging from below 20° C. up to the decomposition temperature of the reactants. In general, however, it is preferred to employ one or more solvents to facilitate the dispersion of the catalyst and the mixing of reactants (A) and (B).

The process of this invention lends itself to the production of a wide variety of materials. For example, when the reactants (A) and (B) contain respectively one ≡SiH and one ≡SiR″ group, the product will comprise a relatively simple compound arising from the addition of these two groups. When reactant (A) contains several, that is, more than two, ≡SiH groups and reactant (B) contains two ≡SiR″ groups, the product will comprise a complex crosslinked structure. Where (B) has three reactive unsaturated groups ≡SiR″, it can be reacted with the silicon hydrogen compound to produce a variety of products ranging from relatively simple compounds to crosslinked polymeric structures, depending on the nature of the silicon hydrogen material. The process of this invention is, however, of particular interest in that it enables the preparation of linear organosilicon polymers containing cyclic silazane or siloxazane structures in the main polymer chain. Such polymers are obtained when both reactants (A) and (B) contain two of the specified ≡SiH and ≡SiH″ radicals and are included within the scope of this invention. They can be represented by the general formula

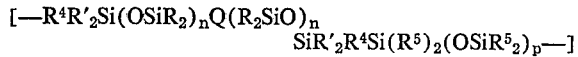

where R$^4$ represents a divalent hydrocarbon radical, R$^5$ represents a monovalent hydrocarbon radical or substituted hydrocarbon radical free of aliphatic unsaturation, Q represents a cyclic silazane or cyclic siloxazane structure which is attached to the adjacent silicon atoms through silicon-nitrogen linkages and $p$ is zero or an integer. In the general formula, R$^4$ represents an aliphatically unsaturated divalent hydrocarbon radical resulting from the addition of the silicon-bonded hydrogen atom to the unsaturated radical R″ and is, for example, the

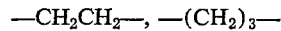

or

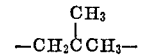

radical. R$^5$ represents a radical selected from the group consisting of a monovalent hydrocarbon, halogenated hydrocarbon, cyanoalkyl, aminoalkyl, and alkoxyalkyl containing less than 19 carbon atoms as defined and exemplified in respect of the organic radicals in reactant (A). Preferably, R′ and R$^5$ are selected from methyl and phenyl radicals.

Reactant (A) is, therefore, preferably a linear organopolysiloxane containing two, or approximately two, organic radicals per silicon atom and two silicon-bonded hydrogen atoms in the molecule. Most preferably reactant (A) is a diorganopolysiloxane having a hydrogen atom attached to each of the terminal silicon atoms in the molecule. The chain length of the diorganopolysiloxane can vary from two to a large number of units depending on the relative ratios of cyclic and linear portions desired in the product.

At least some of the linear polymers of this invention have higher glass transition temperatures, viscosities and crystalline melting points than the corresponding organosiloxanes of similar molecular weight. They can be converted to elastomers by crosslinking and are also useful as lubricants and water repellents.

The following examples illustrate the invention.

EXAMPLE 1

Butyllithium (2.64 g.) as a 22% by weight solution in hexane was added to 2,2,4,4,6,6,8,8-octamethyl-1,5-diaza-3,7-dioxa-2,4,6,8-tetrasilacyclooctane (12.10 g.) in 1,2-dimethoxyethane (100 ml.) at −20° C. and the mixture then allowed to reach room temperature (22° C.). Dimethylvinylchlorosilane (4.95 g.) was added and lithium chloride precipitated. The mixture was then cooled to −30° C., butyllithium (2.64 g.) added and the mixture maintained at this temperature for 15 minutes. Dimethylvinylchlorosilane (4.95 g.) was added at −30° C. and more lithium chloride was precipitated. Filtration of the product and distillation of the filtrate yielded 1-(1,1,3,3-tetramethyl-3-vinyldisiloxanyl)-3-dimethylvinylsilyl - 2,2,4,4,6,6-hexamethyl-1,3-diaza-5 - oxa - 2,4,6 - trisilacyclohexane (11.4 g.).

The trisilacyclohexane product so obtained (4.70 g.) was mixed with a 10% by weight solution (5 μl.) of hexachloroplatinic acid in isopropyl alcohol. To this mixture was then added slowly under argon with stirring tetramethyldisiloxane (1.36 g.). The mixture became viscous after 15 minutes and the temperature of the mixture was then raised to 100° C. for 24 hours. At the end of this period, volatile materials were removed by heating for a further 24 hours under vacuum (1 mm. Hg). The product remaining was a viscous polymeric liquid having a molecular weight of 25,000 and characterized by the repeating unit

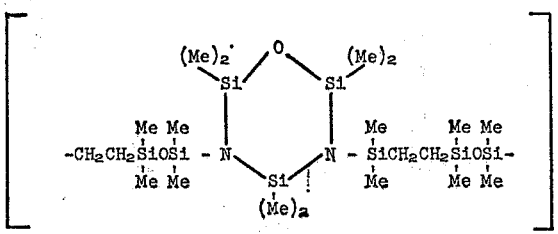

wherein Me represents the methyl radical.

EXAMPLE 2

Butyllithium (4.9 g.) as a 22% by weight solution in hexane was added to 2,2,4,4,6,6,8,8 - octamethyl - 1,5-diaza - 3,7 - dioxa - 2,4,6,8 - tetrasilacyclooctane (11.3 g.) in 1,2-dimethoxyethane (100 ml.) at −30° C. The mixture was maintained at this temperature for 1.5 hours and dimethylvinylchlorosilane (9.25 g.) added. Lithium chloride was precipitated and removed by filtration. Distillation of the filtrate yielded 1,5 - bis(dimethylvinylsilyl) - 2,2,4,4,6,6,8,8 - octamethyl - 1,5 - diaza - 3,7-dioxa-2,4,6,8-tetrasilacyclooctane (12.0 g.).

This product (4.72 g.) was mixed with a 10% solution (5 μl.) of hexachloroplatinic acid in isopropyl alcohol and heated to 60° C. and tetramethyldisiloxane (1.37 g.) added slowly with stirring. After 15 minutes, the mixture became viscous and the temperature was raised to 100° C. for 24 hours. After further heating at this temperature, under vacuum, to remove volatiles, the product remaining was a viscous liquid polymer having a molecular weight of 20,000 and contained as the repeating unit

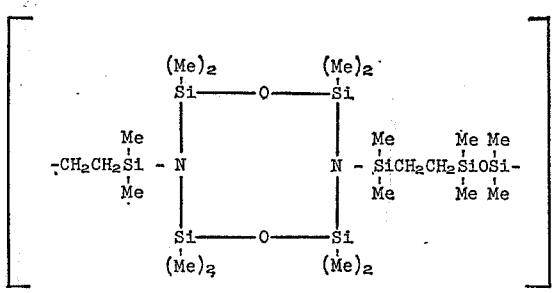

EXAMPLE 3

1 - (1,1,3,3 - tetramethyl - 3 - vinyldisiloxanyl)-3-dimethylvinylsilyl - 2,2,4,4,6,6 - hexamethyl - 1,3-diaza-5 - oxa - 2,4,6 - trisilacyclohexane (4.67 g.) was mixed with a 10% by weight solution (5 μl.) of hexachloroplatinic acid in isopropyl alcohol and the mixture heated to 60 to 80° C. To this mixture was then added slowly under argon with stirring, a dimethylsiloxane (10.85 g.) of molecular weight approximately 1,000 and containing on average between two and three silanic hydrogen atoms per molecule (percent SiH=5.4). The mixture gelled after 15 minutes and the temperature of the mixture was then raised to 100° C. for 24 hours. At the end of this period, volatile materials were removed by heating for a further 24 hours under vacuum (1 mm. Hg). The product remaining was a rubbery gel.

EXAMPLE 4

1,3,5 - tris(vinyldimethylsilyl)-2,2,4,4,6,6-hexamethylcyclotrisilazane (1.0310 g.), bis(vinyldimethylsilyl)-trimethylsilylamine (2.0400 g.), 1,1,3,3,5,5,7,7 - octamethyltetrasiloxane (3.1819 g.) and hexachloroplatinic acid (5 μl. of a 10% by weight solution in isopropyl alcohol) were mixed and heated at 90° C. After 1.5 hour, the mixture had formed a soft gel.

EXAMPLE 5

1 - (1,1,3,3 - tetramethyl - 3 - vinyldisiloxanyl) - 3-dimethylvinylsilyl - 2,2,4,4,6,6 - hexamethyl - 1,3 - diaza-5 - oxa - 2,4,6 - trisilacyclohexane (8.31 g.) was mixed with a 10% by weight solution (5 μl.) of hexachloroplatinic acid in isopropyl alcohol and the mixture heated to 60 to 80° C. To this mixture was then added slowly under argon with stirring, 1,1,3,3,5,5,7,7 - octamethyltetrasiloxane (5.07 g.). The mixture became viscous after 15 minutes and the temperature of the mixture was then raised to 100° C. for 24 hours. At the end of this period, volatile materials were removed by heating for a further 24 hours under vacuum (1 mm. Hg). The product remaining was a viscous polymeric liquid having a molecular weight of 31,000 and characterized by a repeating unit similar to that of the product of Example 1 except that the right hand siloxane portion contained four $Me_2SiO$—units.

That which is claimed is:

1. An organosilicon polymer containing units of the general formula $\{-R^4R'_2Si(OSiR_2)_nQ(R_2SiO)_nSiR'_2R^4SiR_2^5(OSiR_2^5)_p-\}$ wherein each R represents an alkyl radical having less than 7 carbon atoms or a phenyl radical, each R' represents a monovalent hydrocarbon radical or monovalent halogenated hydrocarbon radical free of aliphatic unsaturation, $p$ is 0 or an integer, and $n$ is 0 or 1, $R^4$ represents a divalent hydrocarbon radical, $R^5$ represents a monovalent hydrocarbon radical, halogenated hydrocarbon radical, cyanoalkyl radical, aminoalkyl radical or alkoxyalkyl radical containing less than 19 carbon atoms, Q represents a divalent cyclic silazane or cyclic siloxazane attached to the adjacent silicon atoms through silicon-nitrogen linkages selected from the group consisting of radicals of the formulae

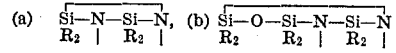

and

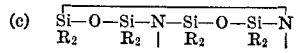

wherein each R is as above defined.

2. An organosilicon polymer as claimed in claim 1 wherein the radicals R' and $R^5$ are selected from methyl, and phenyl radicals.

3. An organosilicon polymer containing units of the general formula $Q\{(SiR_2O)_nSiR'_2R^4Si(R^5)_2(OSiR_2^5)_p\}_3-$ where Q is

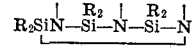

where each R, $n$, R', $R^4$ $R^5$ and $p$ are as defined in claim 1.

4. An organosilicon compound containing units of the general formula $Q\{(SiR_2O)_nSiR'_2R^4Si(R^5)_2(OSiR_2^5)_p\}_x$ where R, $n$, R', $R^4$, $R^5$ and $p$ are as defined in claim 1 and $x$ is 1, 2 or 3 and Q is

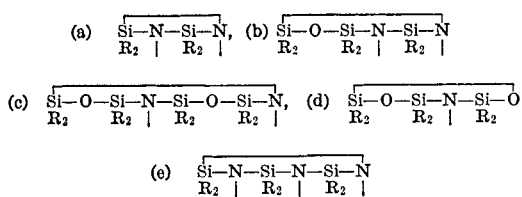

where each R is an alkyl radical of less than 7 carbon atoms or phenyl radical.

5. An organosilicon compound in accordance with claim 4 wherein R' and $R^5$ are selected from the group consisting of $CH_3$ and $C_6H_5$ radicals.

6. An organosilicon polymer containing units of the general formula $Q(SiR_2O)_nSiR'_2R^4Si(R^5)_2(OSiR_2^5)_p$—where Q is

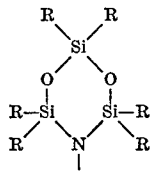

R is an alkyl radical of less than 7 carbon atoms or a phenyl radical, R' is a monovalent hydrocarbon or halogenated hydrocarbon radical free of aliphatic unsaturation, $n$ is 0 or 1, $R^4$ is a divalent hydrocarbon radical, $R^5$ is a monovalent hydrocarbon or substittued hydrocarbon radical free of aliphatic unsaturation and $p$ is 0 or an integer.

References Cited
UNITED STATES PATENTS

| | | | |
|---|---|---|---|
| 2,823,218 | 2/1958 | Speier et al. | 260—448.2 |
| 2,970,150 | 1/1961 | Bailey | 260—348 |
| 3,159,662 | 12/1964 | Ashby | 260—448.2 |
| 3,291,760 | 12/1966 | Bayer | 260—2 |

DONALD E. CZAJA, Primary Examiner

M. I. MARQUIS, Assistant Examiner

U.S. Cl. X.R.

260—2 S, 46.5 G, 46.5 U, 448.2 N